US012315444B2

(12) United States Patent
Sakaguchi et al.

(10) Patent No.: US 12,315,444 B2
(45) Date of Patent: May 27, 2025

(54) PIXEL CIRCUIT, DISPLAY DEVICE, AND ELECTRONIC APPARATUS

(71) Applicant: Sony Semiconductor Solutions Corporation, Kanagawa (JP)

(72) Inventors: Takayuki Sakaguchi, Kanagawa (JP); Takuma Fujii, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 18/335,451

(22) Filed: Jun. 15, 2023

(65) Prior Publication Data

US 2024/0029652 A1 Jan. 25, 2024

Related U.S. Application Data

(63) Continuation of application No. 16/764,215, filed as application No. PCT/JP2018/042052 on Nov. 14, 2018, now Pat. No. 11,721,281.

(30) Foreign Application Priority Data

Nov. 21, 2017 (JP) ................................ 2017-223968

(51) Int. Cl.
*G09G 3/3233* (2016.01)

(52) U.S. Cl.
CPC ... *G09G 3/3233* (2013.01); *G09G 2300/0819* (2013.01); *G09G 2320/0214* (2013.01); *G09G 2320/0233* (2013.01); *G09G 2320/0238* (2013.01)

(58) Field of Classification Search
CPC ......... G09G 3/3233; G09G 2320/0233; G09G 3/3225; H10K 59/1213
See application file for complete search history.

(56) References Cited

U.S. PATENT DOCUMENTS

| | | | | |
|---|---|---|---|---|
| 2005/0017929 | A1 | 1/2005 | Sano et al. | |
| 2005/0258775 | A1* | 11/2005 | Ikeda .................. | G09G 3/3233 315/169.3 |
| 2006/0066532 | A1 | 3/2006 | Jeong | |
| 2008/0018629 | A1 | 1/2008 | Uchino | |
| 2008/0143264 | A1 | 6/2008 | Minami | |

(Continued)

FOREIGN PATENT DOCUMENTS

| | | | |
|---|---|---|---|
| CA | 2 827 959 | A1 | 3/2015 |
| CN | 101021998 | A | 8/2007 |

(Continued)

OTHER PUBLICATIONS

Japanese Office Action issued Jul. 20, 2021 for corresponding Japanese Application No. 2017-223968.

*Primary Examiner* — Yuzhen Shen
(74) *Attorney, Agent, or Firm* — Michael Best & Friedrich LLP

(57) ABSTRACT

Provided is a pixel circuit capable of preventing slight light emission of an organic EL element due to leakage current from a driving transistor.
Provided is a pixel circuit including: a light-emitting element that emits light at luminance corresponding to an amount of current; a first capacitance, which is a metal insulator metal (MIM) capacitance; and a second capacitance, which is a metal insulator semiconductor (MIS) capacitance disposed in parallel to the light-emitting element.

20 Claims, 13 Drawing Sheets

(56) References Cited

U.S. PATENT DOCUMENTS

| | | | | |
|---|---|---|---|---|
| 2012/0286275 | A1 | 11/2012 | Tatara et al. | |
| 2014/0098078 | A1* | 4/2014 | Jeon | H10K 59/1216 345/82 |
| 2014/0312326 | A1* | 10/2014 | Moon | H10K 59/1213 257/40 |
| 2015/0009105 | A1* | 1/2015 | Nomura | G09G 3/006 345/76 |
| 2016/0005384 | A1 | 1/2016 | Yoon et al. | |
| 2016/0104423 | A1 | 4/2016 | Park | |
| 2016/0210898 | A1 | 7/2016 | Tsuge | |
| 2016/0260792 | A1* | 9/2016 | Kim | H10K 59/131 |
| 2018/0174512 | A1 | 6/2018 | Yuan | |
| 2019/0362673 | A1* | 11/2019 | Ueda | H10K 59/131 |
| 2020/0302873 | A1 | 9/2020 | Yamazaki | |

FOREIGN PATENT DOCUMENTS

| | | | |
|---|---|---|---|
| CN | 102779829 | A | 11/2012 |
| CN | 106663407 | A | 5/2017 |
| JP | 2005157261 | A | 6/2005 |
| JP | 2008151963 | A | 7/2008 |
| JP | 2010145579 | A | 7/2010 |
| JP | 2012237805 | A | 12/2012 |
| JP | 2015-034861 | A | 2/2015 |

* cited by examiner

PIXEL CIRCUIT, DISPLAY DEVICE, AND ELECTRONIC APPARATUS

CROSS REFERENCE TO RELATED APPLICATIONS

This is a Continuation Application of U.S. patent application Ser. No. 16/764,215, filed May 14, 2020, which is a 371 National Stage Entry of International Application No.: PCT/JP2018/042052, filed on Nov. 14, 2018, which in turn claims priority from Japanese Priority Patent Application JP 2017-223968 filed on Nov. 21, 2017, the entire contents of which are incorporated herein by reference.

TECHNICAL FIELD

The present disclosure relates to a pixel circuit, a display device, and an electronic apparatus.

BACKGROUND ART

In recent years, flat-panel display devices each including pixels disposed in a matrix, are mainstream in the field of display devices, the pixels each including a light-emitting unit. As one of the flat-panel display devices, there is an organic electro luminescence (EL) display device including an organic EL element that is an example of a so-called current-driven electrooptic element in which the luminance of light emission varies in response to the value of current flowing in a light-emitting unit.

In the flat-panel display device as typified by the organic EL display device, in some cases, a transistor characteristic (e.g., threshold voltage) of a driving transistor that drives an electrooptic element, differs for each pixel due to a variation in process, or the like. For example, PTL 1 discloses a display-device technique that enables the writing time of initialization voltage to the gate node of the driving transistor, to be shortened on the occasion of performance of a correction operation on the characteristic of the driving transistor.

CITATION LIST

Patent Literature

PTL 1

JP 2015-34861 A

SUMMARY

Technical Problem

Achievement of high luminance and achievement of low power consumption are matters to be typically examined for a display device. In examining that an organic EL element is rendered into low voltage toward the achievement of high luminance and the achievement of low power consumption, it is feared that leakage current from a driving transistor in display of black causes the organic EL element to emit light slightly (slight light emission).

Thus, the present disclosure suggests a novel and improved pixel circuit capable of preventing slight light emission of an organic EL element due to leakage current from a driving transistor, a display device, and an electronic apparatus.

Solution to Problem

According to one embodiment of the present disclosure, provided is a pixel circuit including: a light-emitting element that emits light at luminance corresponding to an amount of current; a first capacitance, which is a metal insulator metal (MIM) capacitance; and a second capacitance, which is a metal insulator semiconductor (MIS) capacitance disposed in parallel to the light-emitting element.

Furthermore, according to one embodiment of the present disclosure, provided is a display device including: a pixel array unit in which the pixel circuit is disposed; and a driving circuit that drives the pixel array unit. Furthermore, according to one embodiment of the present disclosure, provided is an electronic apparatus including: the display device.

Advantageous Effects of Invention

As described above, according to one embodiment of the present disclosure, a novel and improved pixel circuit capable of preventing slight light emission of an organic EL element due to leakage current from a driving transistor, a display device, and an electronic apparatus can be provided, i.e., leakage current can be avoided or at least largely suppressed. Further, a novel and improved pixel circuit is presented that is capable of effectively utilizing a layout area for the capacitances. Further, according to embodiments of the present disclosure, in particular embodiments using a metal insulator semiconductor capacitance, in particular a metal oxide semiconductor (MOS) capacitance including a MOS transistor, two metal layers are not required for implementing the capacitance, as generally required for implementing a conventional capacitance.

Still further, according to embodiments of the present disclosure, it is possible to store the signal voltage used to control the luminance of the light emitted by the light-emitting element.

Note that the effect is not necessarily limitative and thus any effect described in the present specification or other effects that can be grasped from the present specification may be provided in addition to the effect or instead of the effect.

DESCRIPTION OF EMBODIMENTS

Figure 1A:
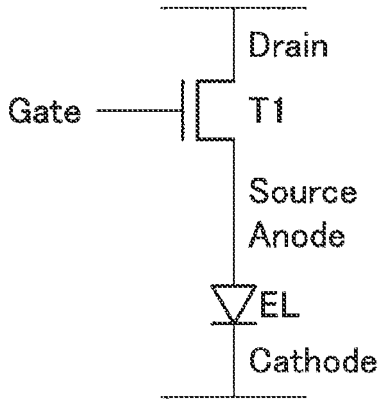
FIG. 1A is an explanatory diagram illustrating a representative configuration circuit including a driving transistor and an organic EL element.

A preferred embodiment of the present disclosure will be described below in detail with reference to the attached drawings. Note that, in the present specification and the drawings, constituent elements having substantially the same functional configurations, are denoted with the same reference signs, and the duplicate descriptions thereof will be omitted.

Note that the descriptions will be given in the following order:

1. Embodiment of Present Disclosure
1.1 Overall Descriptions for Display Device, Method of Driving Display Device, and Electronic Apparatus according to Embodiment of Present Disclosure
1.2 Overview of Present Disclosure
2. Summary

1. Embodiment of Present Disclosure (1.1 Overall Descriptions for Display Device, Method of Driving Display Device, and Electronic Apparatus according to Embodiment of Present Disclosure)

A display device according to an embodiment of the present disclosure, includes a flat-panel display device including a pixel circuit disposed, the pixel circuit having a sampling transistor and holding capacitance in addition to a driving transistor that drives a light-emitting unit. As the flat-panel display device, for example, an organic EL display device, a liquid crystal display device, a plasma display device, and the like can be exemplified. The organic EL display device from the display devices, has an organic EL element as a light-emitting element (electrooptic element) in a pixel, the organic EL element having a phenomenon in which applying an electric field to an organic thin film causes light emission, the organic thin film including organic-material electroluminescence.

The organic EL display device having the organic EL element as the light-emitting unit in the pixel, has the following advantages: In other words, because the organic EL element can be driven at an applied voltage of 10 V or less, the organic EL display device has low power consumption. Because the organic EL element is a self-light-emitting element, the organic EL display device has higher image-visibility in comparison to the liquid crystal display device that is the same flat-panel display device as the organic EL display device is, and furthermore does not need an illuminating member, such as a backlight, so that the organic EL display device is easily rendered into weight reduction and thickness reduction. Moreover, because the response speed of the organic EL element is approximately several microseconds and thus is considerably high-speed, no residual image occurs while the organic EL display device is displaying a moving image.

The organic EL element is not only a self-light-emitting element but also a current-driven electrooptic element. As the current-driven electrooptic element, an inorganic EL element, an LED element, a semiconductor laser element, and the like can be exemplified in addition to the organic EL element.

In various electronic apparatuses each having a display unit, the flat-panel display device, such as the organic EL display device, can be used as the display unit (display device). As the various electronic apparatuses, a head-mounted display, a digital camera, a video camera, a game console, a laptop personal computer, a mobile information apparatus, such as an electronic book, and a mobile communication apparatus, such as a personal digital assistant (PDA), a mobile phone, and the like can be exemplified in addition to a television system.

In the display device, a method of driving the display device, and an electronic apparatus according to the embodiment of the present disclosure, a driving unit can render, after rendering the gate node of the driving transistor into floating, the source node into floating. Furthermore, the driving unit can perform writing of signal voltage with the sampling transistor, with the source node of the driving transistor remaining in floating. Initialization voltage supplied to a signal line at timing different from that of the signal voltage, can be written from the signal line to the gate node of the driving transistor due to sampling of the sampling transistor.

In the display device, the method of driving the display device, and the electronic apparatus according to the embodiment of the present disclosure, each having the preferred configuration described above, the pixel circuit can be formed on a semiconductor, such as silicon. Furthermore, the driving transistor can be a P-channel transistor. The reason why the P-channel transistor is used as the driving transistor instead of an N-channel transistor, is as follows:

In a case where a transistor is formed on a semiconductor, such as silicon, instead of on an insulator, such as a glass substrate, the transistor has four terminals of a source, a gate, a drain, and a backgate (base) instead of having three terminals of a source, a gate, and a drain. Then, the use of the N-channel transistor as the driving transistor causes the voltage of the backgate (substrate) to be 0 V, and thus an adverse effect is caused on an operation of correcting a variation in the threshold voltage of the driving transistor for each pixel, for example.

Generally, there are different options to form source and drain of the transistor used in an embodiment of the disclosed capacitance. One option is to form source and drain within an Si substrate, particularly within a well formed within an Si substrate. This transistor is a so-called a MOS transistor. Another option is to form source and drain within a semiconductor layer (for example, an Si layer such as a polysilicon layer or an amorphous silicon layer) formed on top of an insulating substrate made of such as glass or plastic. This transistor is a so-called thin-film transistor (TFT).

Furthermore, the P-channel transistor having no lightly doped drain (LDD) region has a smaller variation in a transistor characteristic than that the N-channel transistor having an LDD region has, and the P-channel transistor has an advantage in rendering the pixel into miniaturization, by extension, an advantage in rendering the display device into high definition. In a case where the formation onto the semiconductor, such as silicon, is assumed due to the reason or the like, it is preferable that the P-channel transistor is used as the driving transistor instead of the N-channel transistor.

In the display device, the method of driving the display device, and the electronic apparatus according to the embodiment of the present disclosure, each having the preferred configuration described above, the sampling transistor can be also a P-channel transistor.

Alternatively, in the display device, the method of driving the display device, and the electronic apparatus according to the embodiment of the present disclosure, each having the preferred configuration described above, the pixel circuit can have a light-emission control transistor that controls the light-emitting unit between light emission and no light emission. In this case, the light-emission control transistor can be also a P-channel transistor.

Alternatively, in the display device, the method of driving the display device, and the electronic apparatus according to the embodiment of the present disclosure, each having the preferred configuration described above, the holding capacitance can be connected between the gate node and the source node of the driving transistor. Furthermore, the pixel circuit can have auxiliary capacitance connected between the source node of the driving transistor and the node of fixed potential. Alternatively, in the display device, the method of driving the display device, and the electronic apparatus according to the embodiment of present disclosure, each having the preferred configuration described above, the pixel circuit can have a switching transistor connected between the drain node of the driving transistor and the cathode node of the light-emitting unit. In this case, the switching transistor can be also a P-channel transistor. Furthermore, the driving unit can render the switching transistor in conduction for the non-light-emission period of the light-emitting unit.

Alternatively, in the display device, the method of driving the display device, and the electronic apparatus according to the embodiment of the present disclosure, each having the preferred configuration described above, the driving unit renders a signal for driving the switching transistor, active before sampling timing of the initialization voltage due to the sampling transistor. Then, after rendering a signal for driving the light-emission control transistor, active, the driving unit can render the signal inactive. In this case, the driving unit can complete the sampling of the initialization voltage due to the sampling transistor before rendering the signal for driving the light-emission control transistor, inactive.

(1.2. Overview of Present Disclosure)

Figure 1B:
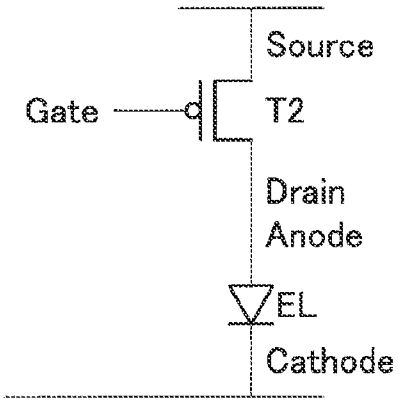
FIG. 1B is an explanatory diagram illustrating a representative configuration circuit including a driving transistor and an organic EL element.

Next, an overview of the present disclosure will be described. FIGS. 1A and 1B are explanatory diagrams each illustrating a representative configuration circuit including a driving transistor and an organic EL element. FIG. 1A illustrates an N-channel transistor used as a driving transistor T1, the source of the driving transistor T1 being connected to the anode of an organic EL element EL. FIG. 1B illustrates a P-channel transistor used as a driving transistor T2, the drain of the driving transistor T2 being connected to the anode of an organic EL element EL.

In order to determine the gate-source voltage of the driving transistor, corresponding to the value of current to flow in the organic EL element, a capacitive element is generally connected in parallel between the anode of the organic EL element that is the source electrode of the N-channel transistor, and the cathode of the organic EL element. Meanwhile, in a case where the P-channel transistor is used as the driving transistor, because the drain of the driving transistor is connected with the organic EL element, a capacitive element is not generally connected in parallel between the anode and the cathode of the organic EL element. Achievement of high luminance and achievement of low power consumption are matters to be typically examined for the display device. In examining that an organic EL element is rendered into low voltage toward the achievement of high luminance and the achievement of low power consumption, it is feared that leakage current from the driving transistor in display of black causes the organic EL element to emit light slightly (slight light emission). The slight light emission is hereinafter also referred to as a light-black-level phenomenon.

Figure 2:
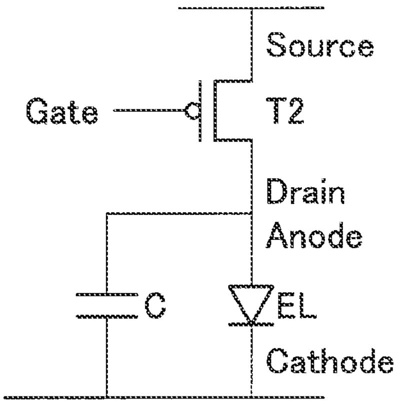
FIG. 2 is an explanatory diagram illustrating a circuit configuration in which MIM capacitance C is connected in parallel to the organic EL element EL in the circuit illustrated in FIG. 1B.
Figure 3:
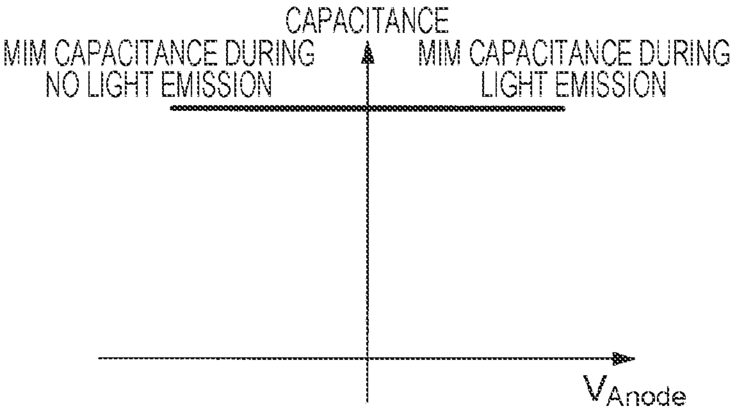
FIG. 3 is an explanatory graphical representation illustrating a characteristic of the MIM capacitance.

As a countermeasure against the light-black-level phenomenon, there is a technique of connecting metal insulator metal (MIM) capacitance in parallel to the organic EL element. FIG. 2 is an explanatory diagram illustrating a circuit configuration in which MIM capacitance C is connected in parallel to the organic EL element EL in the circuit illustrated in FIG. 1B. Furthermore, FIG. 3 is an explanatory graphical representation illustrating a characteristic of the MIM capacitance. FIG. 3 is a graph having a horizontal axis representing the voltage of the anode of the organic EL element EL and a vertical axis representing the capacitance value of the MIM capacitance. As illustrated in FIG. 3, the capacitance value of the MIM capacitance C is constant regardless of the voltage VAnode of the anode of the organic EL element EL.

Figure 4:
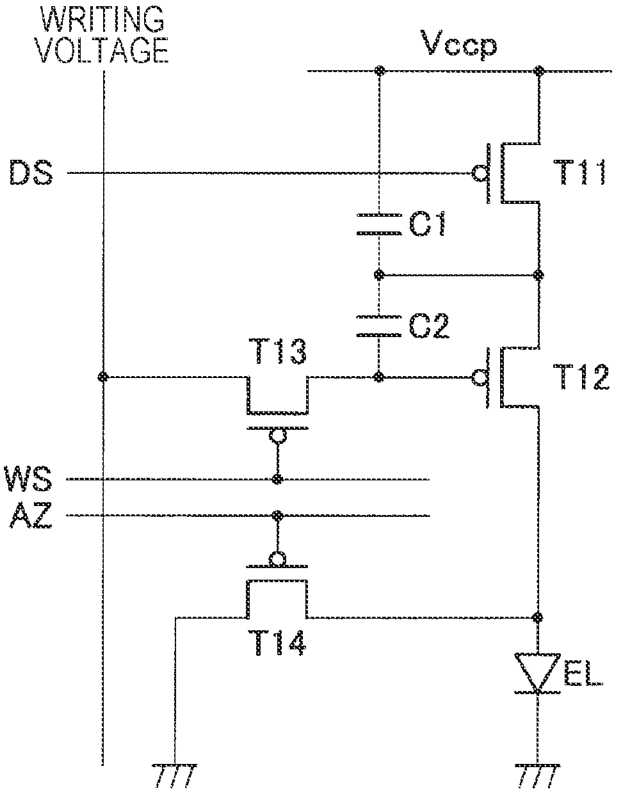
FIG. 4 is an explanatory diagram illustrating a pixel circuit in an organic EL display device according to an embodiment of the present disclosure.

FIG. 4 is an explanatory diagram illustrating a pixel circuit in an organic EL display device according to the embodiment of the present disclosure. The pixel circuit includes transistors T11 to T14, capacitors C1 and C2, and an organic EL element EL.

The transistor T11 is a light-emission control transistor that controls light emission of the organic EL element EL. The transistor T11 connected between the power-source node of power-source voltage VCCP and the source node of the transistor T12 (source electrode), controls the organic EL element EL between light emission and no light emission under drive due to a light-emission control signal from a signal line DS.

The transistor T12 is a driving transistor that causes driving current corresponding to the holding voltage of the capacitor C2, to flow in the organic EL element EL and drives the organic EL element EL.

The transistor T13 switches between ON and OFF due to a signal from a signal line WS and samples signal voltage Vsig, to write the signal voltage Vsig into the gate node (gate electrode) of the transistor T12.

The transistor T14 is a reset transistor connected between the drain node of the transistor T12 (drain electrode) and a current-discharge destination node. Under drive due to a driving signal supplied from a signal line AZ, the transistor T14 controls the organic EL element EL such that the organic EL element EL does not emit light for the non-light-emission period of the organic EL element EL. The transistors T11 to T14 each can be a P-channel transistor.

The capacitor C2 connected between the gate node and the source node of the transistor T12, holds the signal voltage Vsig written by the sampling of the transistor T13. The capacitor C1 is connected between the source node of the transistor T12 and the node of fixed potential (e.g., the power-source node of the power-source voltage VCCP). The capacitor C1 inhibits the source voltage of the transistor T12 from varying while the signal voltage is being written, and additionally functions such that the gate-source potential Vgs of the transistor T12 becomes the threshold voltage Vth of the transistor T12. In this embodiment, the holding capacitance includes the two capacitors C1 and C2, but the holding capacitance can alternatively be formed by only one of the capacitors C1 or C2. At least one of the capacitors C1 or C2 may e.g. be implemented as MIM capacitor. By employing a MIM capacitor using higher level metal layers (e.g. a second and a third metal layers) for at least one of the capacitors C1 or C2, and by employing a MIS capacitor using a lower level metal layer (e.g. a first metal layer) and a semiconductor region for the capacitance parallel to the organic EL element EL, the layout of these capacitors can be effectively and flexibly optimized in a three-dimensional way (e.g. overlapping each other).

Figure 5:
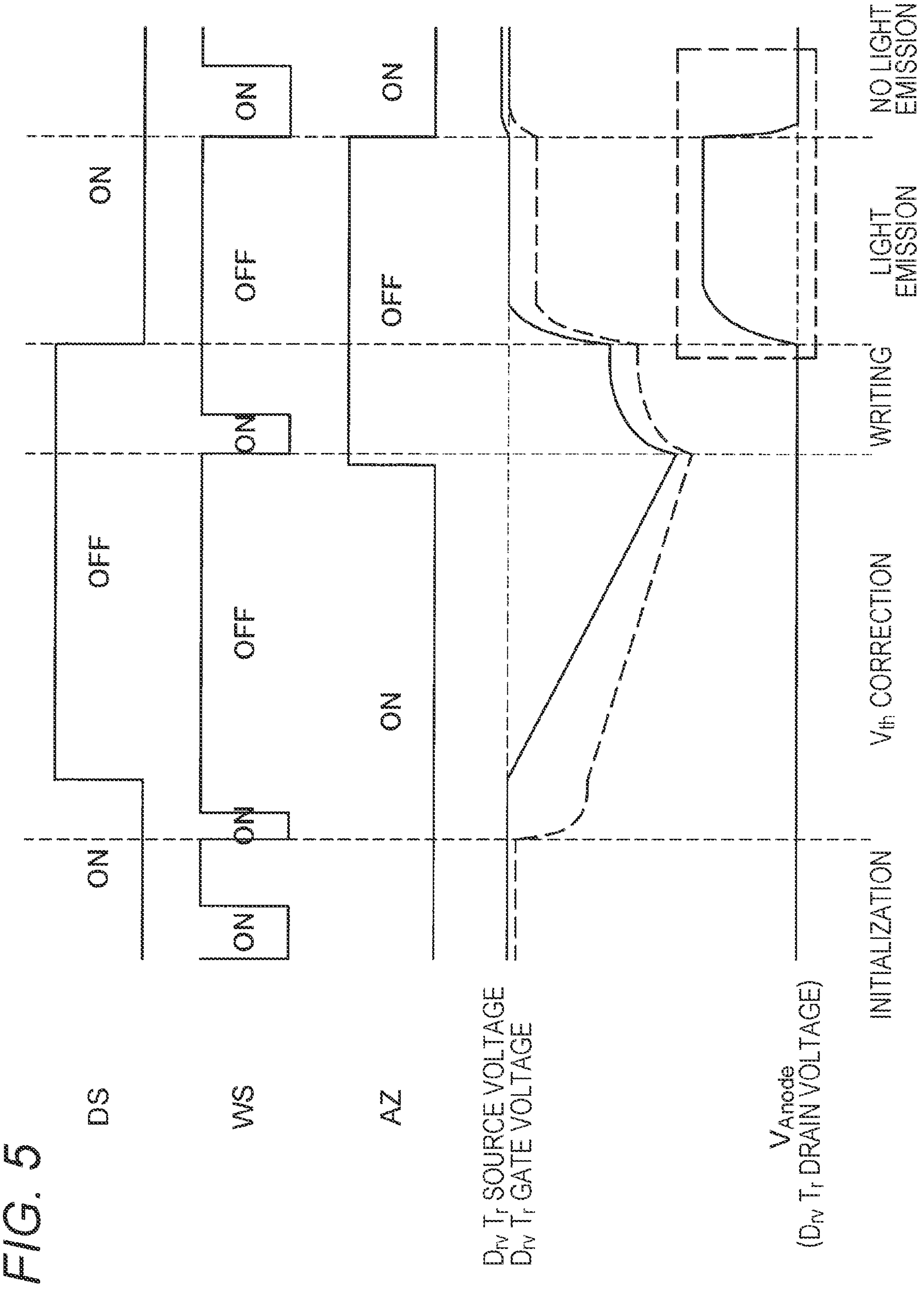
FIG. 5 is an explanatory timing chart for a method of driving the pixel circuit illustrated in FIG. 4.

FIG. 5 is an explanatory timing chart for a method of driving the pixel circuit illustrated in FIG. 4. The pixel circuit illustrated in FIG. 4 has an initialization period, a Vth correction period, a writing period, and a light-emission period in one horizontal period. In the initialization period, first, the pixel circuit temporarily turns the transistor T13 ON with the signal line WS at a low level and then turns the transistor T13 OFF with the signal line WS at a high level.

In the following Vth correction period, the transistor T13 is temporarily turned ON with the signal line WS at the low level, and then the transistor T13 is turned OFF with the signal line WS at the high level. Then, the transistor T11 is turned OFF with the signal line DS at a high level, so that the source voltage and the gate voltage of the transistor T12 drop. In the Vth correction period, the gate-source potential Vgs of the transistor T12 is set to the threshold voltage Vth of the transistor T12. Furthermore, the signal line AZ switches from a low level to a high level for the Vth correction period.

In the following writing period, the signal line WS switches from the high level to the low level, and the signal voltage Vsig is written into the transistor T12. The writing of the signal voltage Vsig into the transistor T12 causes the gate potential of the transistor T12 to be Vsig. Subsequently, the signal line WS switches from the low level to the high level, and the writing period of the signal voltage Vsig to the transistor T12 finishes. Then, in the following light-emission period, the signal line DS switches from the high level to a low level and the transistor T11 is turned ON, so that the organic EL element EL emits light. In the light-emission period, the source potential of the transistor T12 becomes the power-source voltage VCCP.

Figure 6:
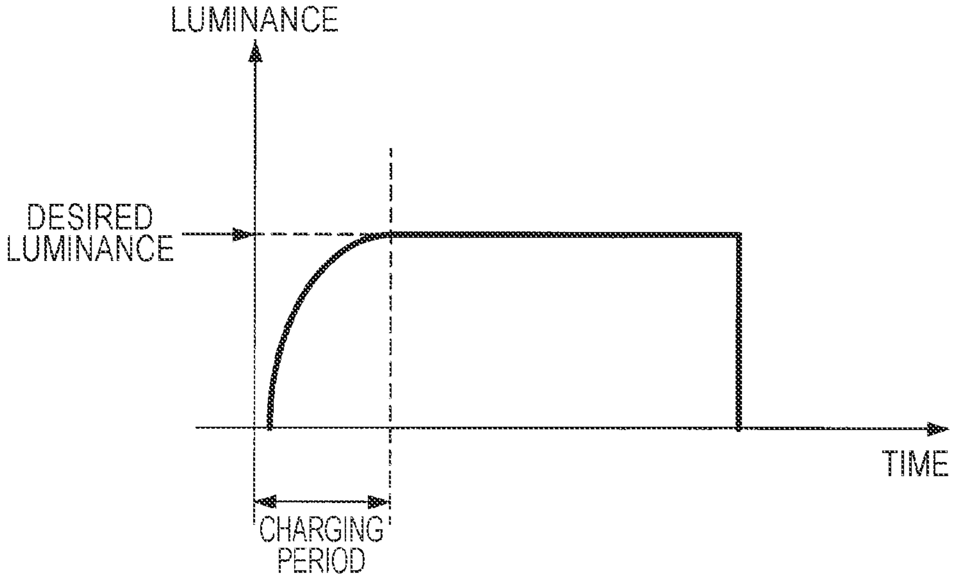
FIG. 6 is an explanatory graph illustrating a charging period until the luminance of an organic EL element EL reaches desired luminance.

FIG. 6 is an explanatory graph illustrating a charging period until the luminance of the organic EL element EL reaches desired luminance. Connecting MIM capacitance in parallel to the organic EL element EL, causes the charging period of the organic EL element EL until the luminance of the organic EL element EL reaches the desired luminance, to lengthen in the light-emission period. Influence on a gamma characteristic due to the connection of the MIM capacitance in parallel to the organic EL element EL, will be described.

Figure 7:
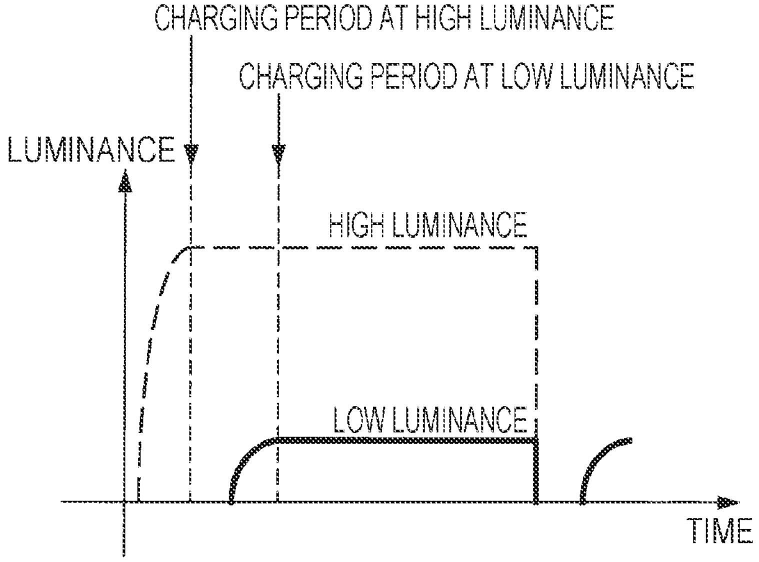
FIG. 7 is an explanatory graph illustrating a difference in charging time due to a difference in luminance.
Figure 8:
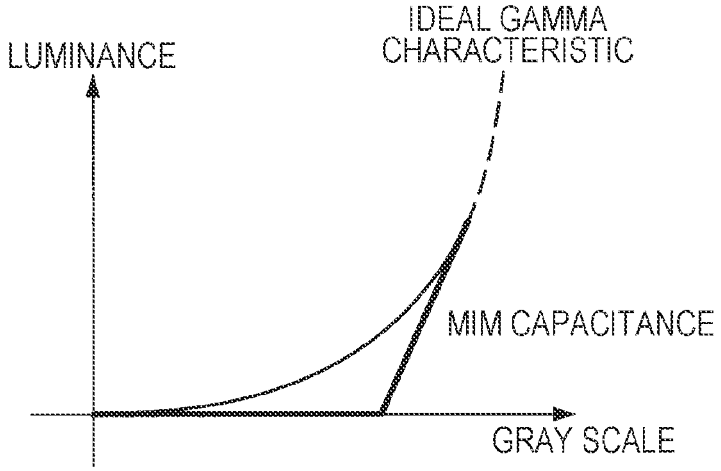
FIG. 8 is an explanatory graphical representation illustrating an ideal gamma characteristic at a low gray scale and a gamma characteristic in a case where the MIM capacitance is connected in parallel to the organic EL element EL.

The connection of the MIM capacitance in parallel to the organic EL element EL, causes a gamma shape at low luminance to vary. FIG. 7 is an explanatory graph illustrating a difference in charging time due to a difference in luminance. As illustrated in FIG. 7, the charging time at low luminance is longer than the charging time at high luminance. FIG. 8 is an explanatory graphical representation illustrating an ideal gamma characteristic at a low gray scale and the gamma characteristic in a case where the MIM capacitance is connected in parallel to the organic EL element EL. The low luminance lengthens the charging period of the organic EL element EL, and the connection of the MIM capacitance further lengthens the charging period because current flows in the MIM capacitance. In this state, a decrease in duty cycle causes an image to be switched before the light emission at the desired luminance. That is, as illustrated in FIG. 8, the gamma shape varies in a direction in which the luminance reduces at the low gray scale.

Figure 9:
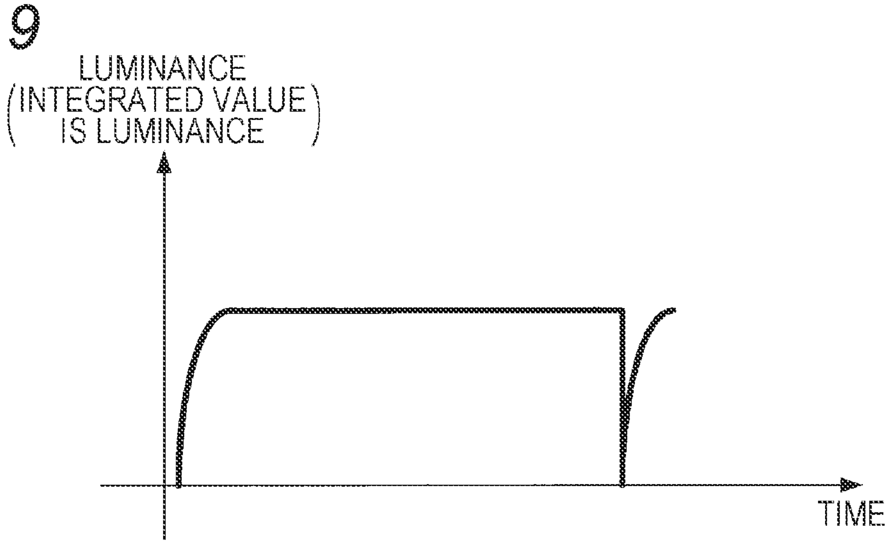
FIG. 9 is an explanatory graphical representation illustrating the relationship between time and the luminance of the organic EL element EL.
Figure 10:
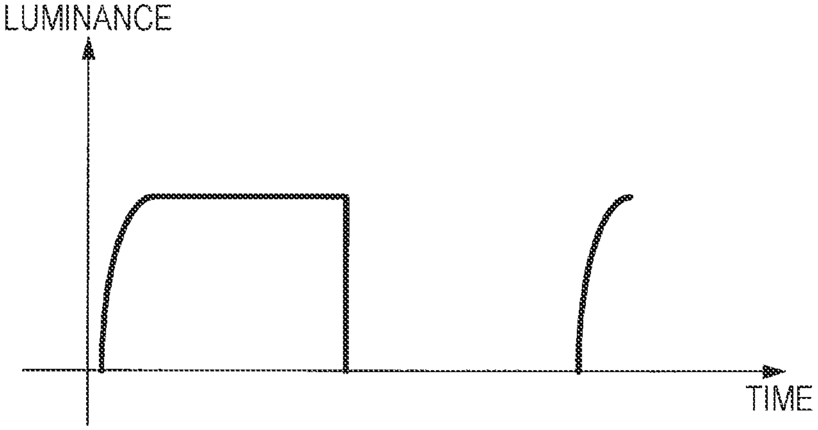
FIG. 10 is an explanatory graphical representation illustrating the relationship between time and the luminance of the organic EL element EL.

FIGS. 9 and 10 are explanatory graphical representations each illustrating the relationship between time and the luminance of the organic EL element EL. Integration of each of the graphs illustrated in FIGS. 9 and 10, results in the luminance of the organic EL element EL. Therefore, FIG. 9 illustrates the relationship between time and luminance in a case where the duty cycle is 100%, and FIG. 10 illustrates the relationship between time and luminance in a case where the duty cycle is 50%. When the duty cycle is halved in this manner, the luminance halves or less as the charging period lengthens due to the MIM capacitance. In other words, imbalance is conspicuous between a variation in duty cycle and a variation in luminance. In a case where the MIM capacitance is connected in parallel to the organic EL element EL, it is necessary that the luminance be adjusted in changing the duty cycle.

Thus, according to the present embodiment, capacitance to be connected in parallel to an organic EL element is MOS capacitance instead of being the MIM capacitance. The MOS capacitance has a capacitance value varying depending on voltage applied to the gate terminal. Use of this characteristic can inhibit the light-black-level phenomenon from occurring, the imbalance between a variation in duty cycle and a variation in luminance, and a variation in the gamma characteristic at the low gray scale.

Furthermore, according to the present embodiment, the adoption of the MOS capacitance as the capacitance to be connected in parallel to an organic EL element, renders MIM wiring unnecessary. If the miniaturization of a MOS transistor progresses, the adoption of the MOS capacitance as the capacitance to be connected in parallel to an organic EL element, can contribute to a reduction in circuit area, remarkably.

Figure 11:
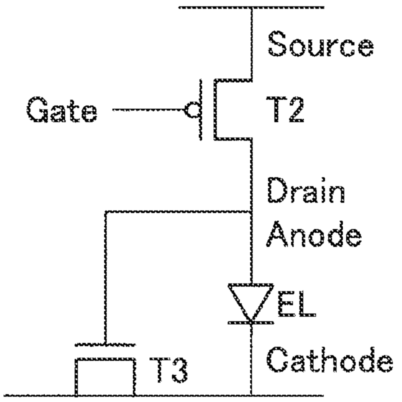
FIG. 11 is an explanatory diagram illustrating the simplified circuit configuration of a pixel circuit according to the embodiment of the present disclosure.
Figure 12:
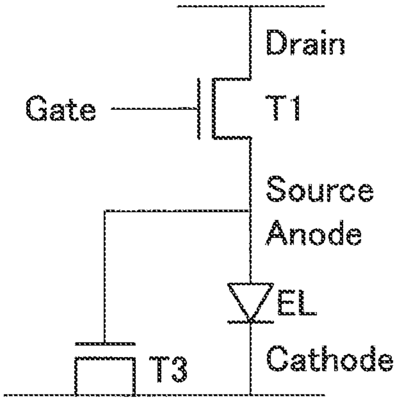
FIG. 12 is an explanatory diagram illustrating the simplified circuit configuration of a pixel circuit according to the embodiment of the present disclosure.

FIGS. 11 and 12 are explanatory diagrams illustrating the simplified circuit configurations of pixel circuits according to the embodiment of the present disclosure. FIG. 11 illustrates a P-channel transistor used as a driving transistor T2, the drain of the driving transistor T2 being connected to the anode of an organic EL element EL. FIG. 12 illustrates an N-channel transistor used as a driving transistor T1, the source of the driving transistor T1 being connected to the anode of an organic EL element EL. In other words, each MOS capacitance T3 has an anode and a cathode identical in potential.

Then, as illustrated in FIGS. 11 and 12, each pixel circuit according to the embodiment of the present disclosure, has the MOS capacitance T3 connected in parallel to the organic EL element EL. An N-channel transistor is used for the MOS capacitance T3. The gate of the MOS capacitance T3 is connected to the anode of the organic EL element EL, and the source and the drain of the MOS capacitance T3 are connected to the cathode of the organic EL element EL. As described above, the MOS capacitance has a capacitance value varying depending on voltage applied to the gate terminal.

The connection of the MOS capacitance T3 in parallel to the organic EL element EL in this manner enables the capacitance value of the MOS capacitance T3 to vary between light emission and no light emission of the organic EL element EL.

Figure 13:
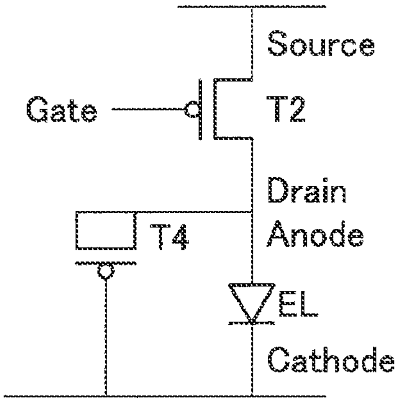
FIG. 13 is an explanatory diagram illustrating the simplified circuit configuration of a pixel circuit according to the embodiment of the present disclosure.

FIG. 13 is an explanatory diagram illustrating the simplified circuit configuration of a pixel circuit according to the embodiment of the present disclosure. FIG. 13 illustrates a P-channel transistor used as a driving transistor T2, the drain of the driving transistor T2 being connected to the anode of an organic EL element EL.

Then, as illustrated in FIG. 13, the pixel circuit according to the embodiment of the present disclosure, has MOS capacitance T4 connected in parallel to the organic EL element EL. A P-channel transistor is used for the MOS capacitance T4. The MOS capacitance T4 has an anode and a cathode identical in potential.

Figure 14:
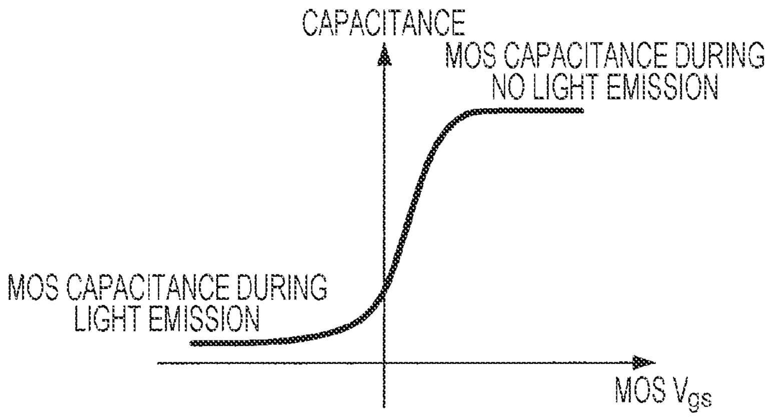
FIG. 14 is an explanatory graphical representation illustrating a characteristic of MOS capacitance.

FIG. 14 is an explanatory graphical representation illustrating a characteristic of the MOS capacitance. FIG. 14 is a graph having a horizontal axis representing the gate-source potential Vgs of the MOS capacitance T4 and a vertical axis representing the capacitance value of the MOS capacitance T4. As illustrated in FIG. 14, the capacitance value of the MOS capacitance T4 is small in a case where the gate-source potential Vgs is low, namely, in a state where the organic EL element EL emits light. The capacitance value of the MOS capacitance T4 is large in a case where the gate-source potential Vgs is high, namely, in a state where the organic EL element EL emits no light. Therefore, because the capacitance value of the MOS capacitance 14 is small during the light emission of the organic EL element EL, the charging period of the MOS capacitance T4 is short. Therefore, the connection of the MOS capacitance in parallel to the organic EL element EL, can inhibit the gamma characteristic from varying at a low gray scale.

The characteristic of the MOS capacitance can be fine-adjusted in a manufacturing process and the capacitance value of the MOS capacitance can be controlled, differently from the MIM capacitance. Furthermore, the connection of the MOS capacitance in parallel to the organic EL element EL, can inhibit a variation in time until the organic EL element EL reaches the desired luminance even when the characteristic of the organic EL element EL varies as time elapses.

Figure 15:
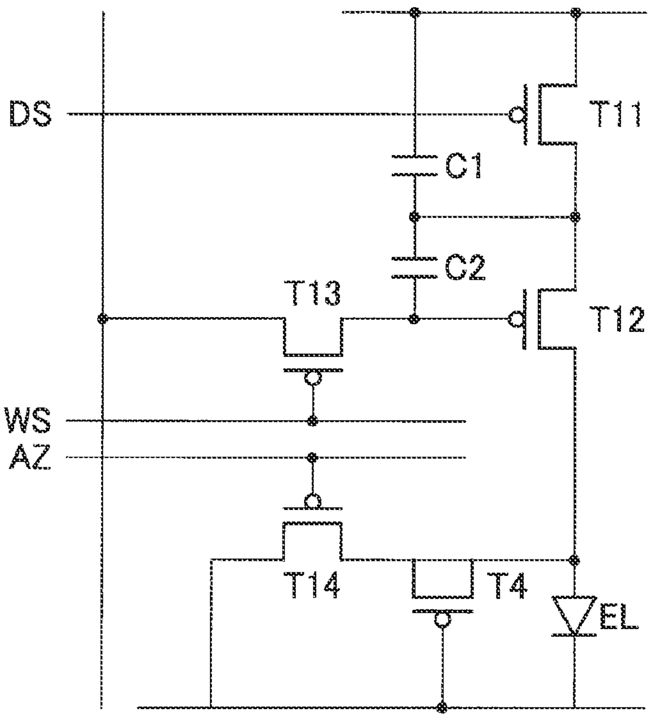
FIG. 15 is an explanatory diagram illustrating a pixel circuit according to the embodiment of the present disclosure.

FIG. 15 is an explanatory diagram illustrating a pixel circuit according to the embodiment of the present disclosure. The pixel circuit illustrated in FIG. 15 includes MOS capacitance 14 added in parallel to the organic EL element EL in the pixel circuit illustrated in FIG. 4. In this manner, the addition of the MOS capacitance T4 in parallel to the organic EL element EL in the pixel circuit illustrated in FIG. 4, can inhibit the light-black-level phenomenon from occurring, the imbalance between a variation in duty cycle and a variation in luminance, and a variation in the gamma characteristic at a low gray scale.

Figure 16:
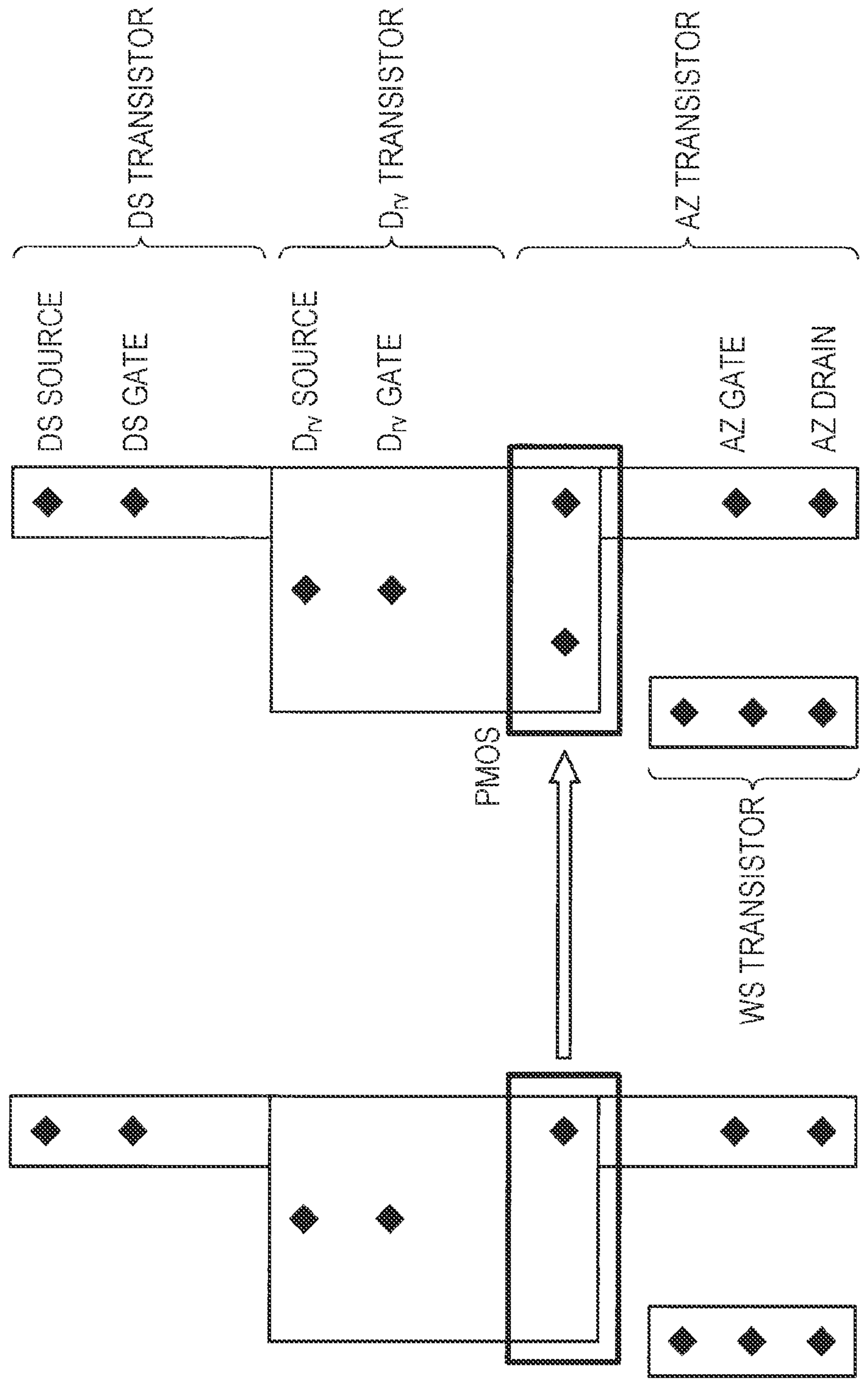
FIG. 16 is a diagram schematically illustrating the layouts of the pixel circuits illustrated in FIGS. 4 and 15.

FIG. 16 is an explanatory diagram schematically illustrating the layouts of the pixel circuits illustrated in FIGS. 4 and 15. The layout of the pixel circuit illustrated in FIG. 4 is illustrated on the left side, and the layout of the pixel illustrated in FIG. 15, namely, the layout of the pixel circuit including the MOS capacitance T4 added to the pixel circuit illustrated in FIG. 4 is illustrated on the right side. FIG. 16 exemplifies the layout of the transistor T11 (DS transistor), the transistor T12 (Dry transistor), the transistor T13 (WS transistor), and the transistor T14 (AZ transistor).

In a case where a PMOS transistor is used as the MOS capacitance, the MOS capacitance can be manufactured in the same process in which the other transistors are manufactured. Therefore, because it is unnecessary that a layer be added in adding the MOS capacitance T4 to the pixel circuit illustrated in FIG. 4, the MOS capacitance T4 can be laid out at a layer the same as that of each transistor. Furthermore, in adding the MOS capacitance T4 to the pixel circuit illustrated in FIG. 4, the addition can be achieved with part of the layout, and thus the MOS capacitance T4 can be added without changing the layout largely.

Figure 17:
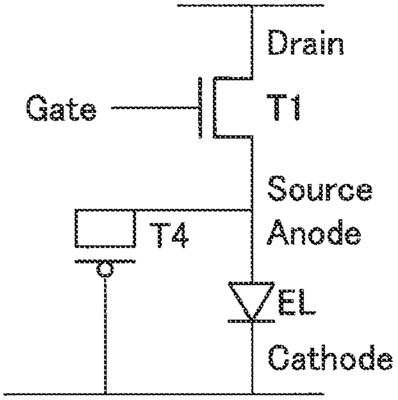
FIG. 17 is an explanatory diagram illustrating the simplified circuit configuration of a pixel circuit according to the embodiment of the present disclosure.

Another example will be given. FIG. 17 is an explanatory diagram illustrating the simplified circuit configuration of a pixel circuit according to the embodiment of the present disclosure. FIG. 17 illustrates an N-channel transistor used as a driving transistor T1, the source of the driving transistor T1 being connected to the anode of an organic EL element EL.

Then, as illustrated in FIG. 17, the pixel circuit according to the embodiment of the present disclosure, has MOS capacitance T4 connected in parallel to the organic EL element EL. A P-channel transistor is used for the MOS capacitance T4. The connection of the MOS capacitance T4 in parallel to the organic EL element EL in this manner, can inhibit the light-black-level phenomenon from occurring, the imbalance between a variation in duty cycle and a variation in luminance, and a variation in the gamma characteristic at a low gray scale.

Figure 18:
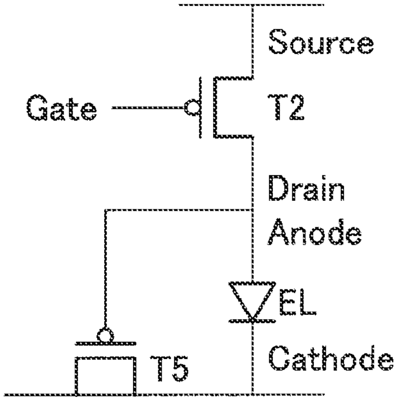
FIG. 18 is an explanatory diagram illustrating the simplified circuit configuration of a pixel circuit according to the embodiment of the present disclosure.
Figure 19:
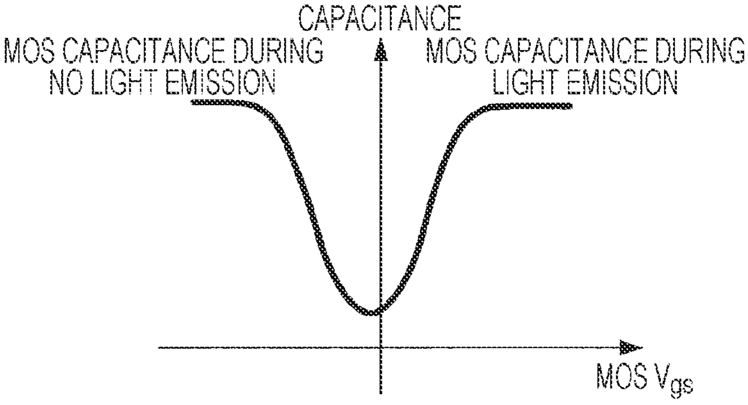
FIG. 19 is an explanatory graph illustrating a characteristic of MOS capacitance T5 in low-frequency drive.

Another example will be given. FIG. 18 is an explanatory diagram illustrating the simplified circuit configuration of a pixel circuit according to the embodiment of the present disclosure. FIG. 18 exemplifies the configuration of the pixel circuit with drive at a low frequency. At the low frequency, the capacitance of a PMOS transistor is large in a case where gate-source voltage is negative, namely, during no light emission. FIG. 19 is an explanatory graph illustrating a characteristic of MOS capacitance T5 with the drive at the low frequency. The drive at the low frequency increases the capacitance of the PMOS transistor during no light emission as illustrated in FIG. 19. In this case, the gate electrode of the MOS capacitance T5 may be connected to the anode of an organic EL element EL and a drain electrode, and the source electrode of the MOS capacitance T5 may be connected to a ground, the cathode of the organic EL element EL, or a different power source.

Figure 20:
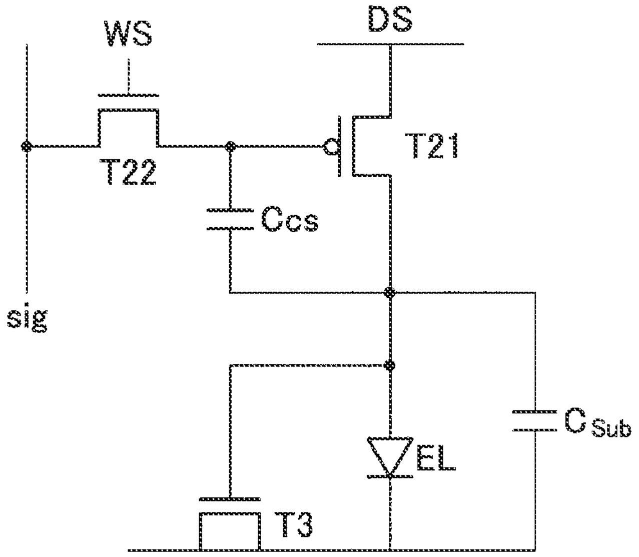
FIG. 20 is an explanatory diagram illustrating the circuit configuration of a pixel circuit according to the embodiment of the present disclosure.

Another example will be given. FIG. 20 is an explanatory diagram illustrating the circuit configuration of a pixel circuit according to the embodiment of the present disclosure. FIG. 20 exemplifies the configuration of the pixel circuit including two transistors T21 and T22 and two capacitors Ccs and Csub, the pixel circuit including an organic EL element EL connected in parallel to MOS capacitance T3. In the pixel circuit, the connection of the MOS capacitance T3 in parallel to the organic EL element EL, can inhibit the light-black-level phenomenon from occurring, the imbalance between a variation in duty cycle and a variation in luminance, and a variation in the gamma characteristic at a low gray scale.

Figure 21:
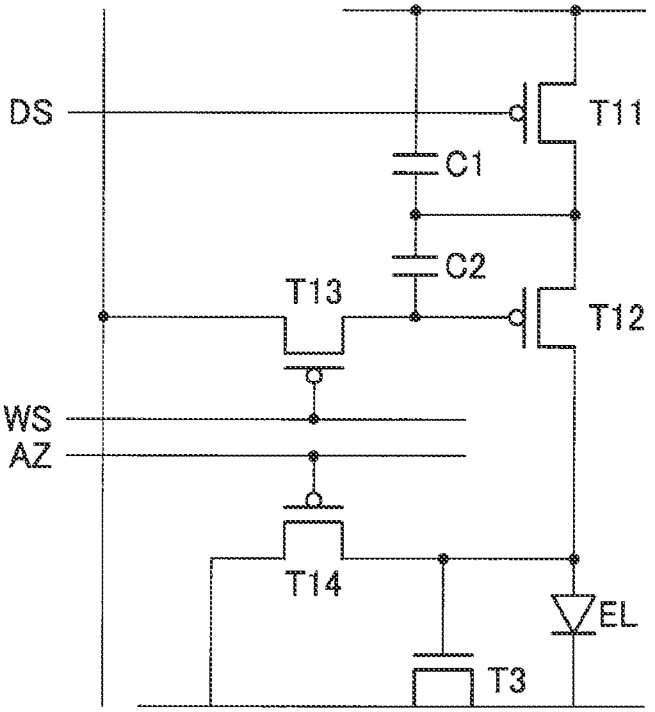
FIG. 21 is an explanatory diagram illustrating the circuit configuration of a pixel circuit according to the embodiment of the present disclosure.

Another example will be given. FIG. 21 is an explanatory diagram illustrating the circuit configuration of a pixel circuit according to the embodiment of the present disclosure. FIG. 21 exemplifies the configuration of the pixel circuit including four transistors T11 to T14 and two capacitors C1 and C2, the pixel circuit including MOS capacitance T3 connected in parallel to an organic EL element EL. In the pixel circuit, the connection of the MOS capacitance T3 in parallel to the organic EL element EL, can inhibit the light-black-level phenomenon from occurring, the imbalance between a variation in duty cycle and a variation in luminance, and a variation in the gamma characteristic at a low gray scale.

Figure 22:
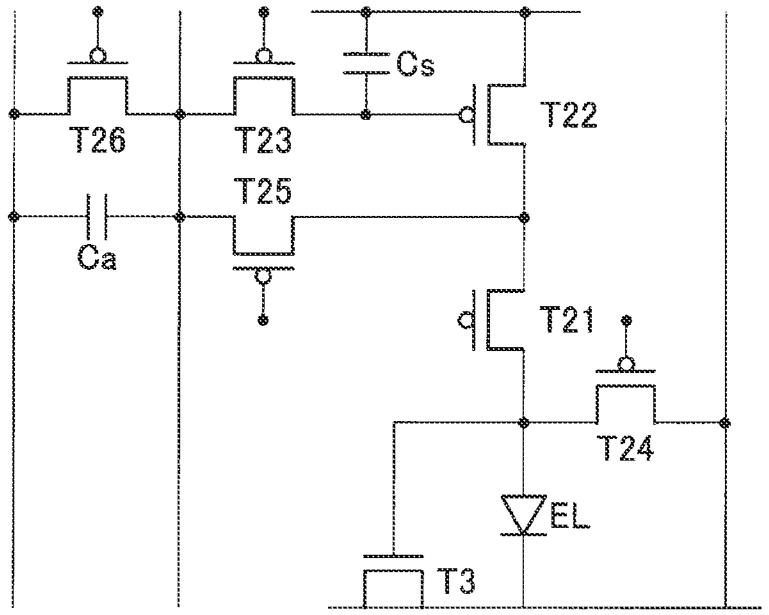
FIG. 22 is an explanatory diagram illustrating the circuit configuration of a pixel circuit according to the embodiment of the present disclosure.

Another example will be given. FIG. 22 is an explanatory diagram illustrating the circuit configuration of a pixel circuit according to the embodiment of the present disclosure. FIG. 22 exemplifies the configuration of the pixel circuit including six transistors T21 to T26 and two capacitors Cs and Ca, the pixel circuit including MOS capacitor T3 connected in parallel to an organic EL element EL. In the pixel circuit, the connection of the MOS capacitance T3 in parallel to the organic EL element EL, can inhibit the light-black-level phenomenon from occurring, the imbalance between a variation in duty cycle and a variation in luminance, and a variation in the gamma characteristic at a low gray scale.

Figure 23:
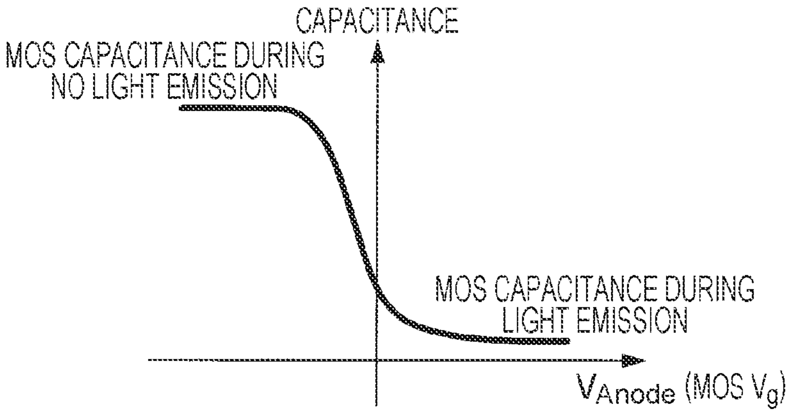
FIG. 23 is an explanatory graphical representation illustrating a characteristic of MOS capacitance including an N-channel transistor.

FIG. 23 is an explanatory graphical representation illustrating a characteristic of MOS capacitor including an N-channel transistor. The capacitance value of the MOS capacitor including the N-channel transistor is large in a case where an organic EL element EL emits no light, namely, in a case where the potential of the anode of the organic EL element EL is low. The capacitance value of the MOS capacitor is small in a case where the organic EL element EL emits light, namely, in a case where the potential of the anode of the organic EL element EL is high. Therefore, because the charging period of the MOS capacitor T3 is short during the light emission of the organic EL element EL, the connection of the MOS capacitor in parallel to the organic EL element EL, can inhibit a variation in the gamma characteristic at a low gray scale.

In the abovementioned embodiments, the MOS capacitor on a semiconductor substrate (an Si substrate) is used as an example of a MIS capacitor, but in a case of employing the insulating substrate, a structure including a semiconductor layer, an insulating layer and a metal layer stacked on the insulating substrate can be used as a MIS capacitor. For example, a MIS capacitor can be achieved by making the potential of source and drain of TFT identical similar to the example of using the MOS transistor.

In FIGS. 24A-24D several embodiments of a MIS capacitance as used in embodiments of the present disclosure are depicted as cross-sectional views, i.e., different options for implementing the MIS capacitance in the above-mentioned embodiments are shown. It shall be noted that these figures show implementations of a P-channel MOS transistor or TFT. The MOS or TFT capacitance can, however, also be implemented using an N-channel MOS transistor.

Figure 24A:
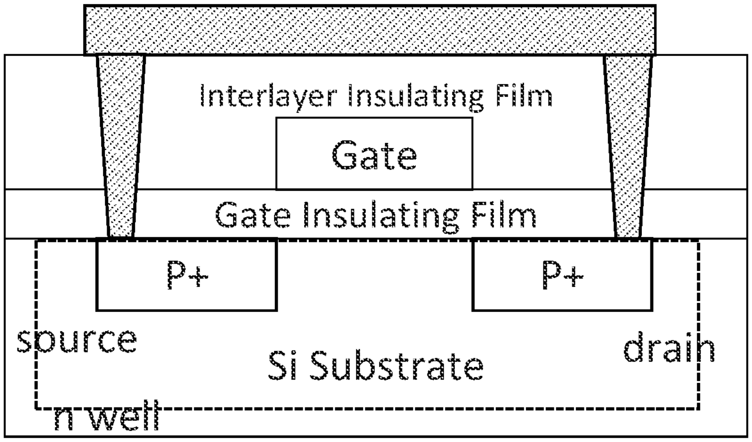
FIG. 24A is a cross-sectional view of the layers a first embodiment of a MOS capacitance.

FIG. 24A illustrates a first embodiment of a MIS capacitance employing a MOS capacitance. In this embodiment source and drain of the MOS transistor are implemented as separate P+ doped areas within an n-well formed within an Si substrate. Source and drain are connected through vias leading through a gate insulating film and an interlayer insulating film and a connection line formed on the top surface of the interlayer insulating film to make sure that source potential and drain potential are identical to each other.

Figure 24B:
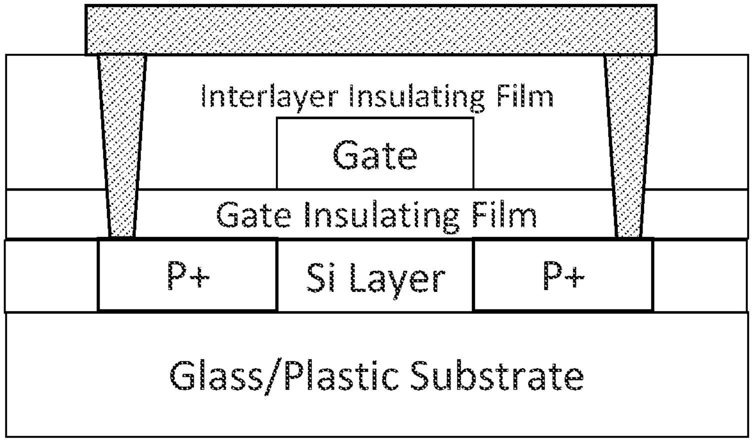
FIG. 24B is a cross-sectional view of the layers a second embodiment of a MIS capacitance.

FIG. 24B illustrates a second embodiment of a MIS capacitance employing a TFT capacitance. Different from the embodiment shown in FIG. 24A, a structure, in which an Si layer, an insulating layer (a gate insulating film) and a metal layer (a gate electrode layer) are stacked on the insulating substrate, is provided to form a TFT. Source and drain of the TFT are again implemented as separate P+ doped areas within the Si layer formed on top of the insulating substrate made of glass or plastic.

Figure 24C:
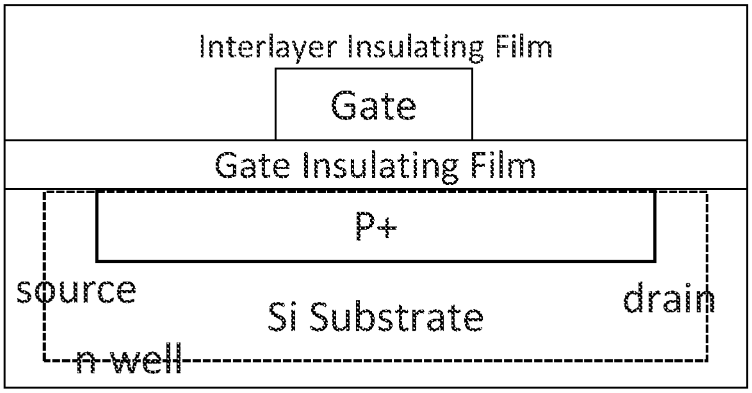
FIG. 24C is a cross-sectional view of the layers a third embodiment of a MOS capacitance.

FIG. 24C illustrates a third embodiment of a MIS capacitance employing a MOS capacitance. Different from the embodiment shown in FIG. 24A, source and drain of the MOS transistor are implemented as common P+ doped area within an n-well formed within an Si substrate. A connection of different P+ doped areas through vias and a connection line as in the embodiment shown in FIG. 24A is thus not required to make sure that source potential and drain potential are identical to each other.

Figure 24D:
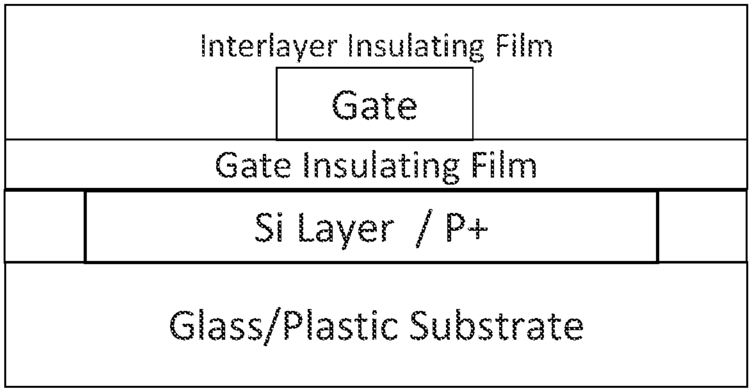
FIG. 24D is a cross-sectional view of the layers a fourth embodiment of a MIS capacitance.

FIG. 24D illustrates a fourth embodiment of a MIS capacitance employing a TFT capacitance. Like in the embodiment shown in FIG. 24C source and drain of the TFT are implemented as common P+ doped area, but not in an n-well formed within an Si layer, but like in the embodiment shown in FIG. 24B within an Si layer formed on top of a substrate made of glass or plastic. Again, no connections through vias and a connection line are thus required.

2. Summary

As described above, according to the embodiment of the present disclosure, provided are a pixel circuit capable of inhibiting, with connection of MOS capacitance in parallel to an organic EL element EL, the light-black-level phenomenon from occurring, the imbalance between a variation in duty cycle and a variation in luminance, a variation in the gamma characteristic at a low gray scale, a display device including the pixel circuit, and an electronic apparatus including the display device. The preferred embodiment of the present disclosure has been described in detail with reference to the attached drawings, but the technical scope of the present disclosure is not limited to the examples. It is obvious that a person skilled in the technical field of the present disclosure conceives various alterations or modifications in the scope of the technical idea described in the claims, and thus it is understood that these rightfully belong to the technical scope of the present disclosure.

Furthermore, the effects described in the present specification are just explanatory or exemplary, and thus are not limitative. That is, the technology according to one embodiment of the present disclosure has other effects obvious to a person skilled in the art, from the descriptions in the present specification, in addition to the effects or instead of the effects.

Note that the following configurations belong to the technical scope of the present disclosure.

(1)

A pixel circuit including:

a light-emitting element configured to emit light at luminance corresponding to an amount of current; and metal oxide semiconductor (MOS) capacitance including a MOS transistor disposed in parallel to the light-emitting element, in which the MOS capacitance has source potential and drain potential that are identical to each other.

(2)

The pixel circuit described in the (1), further including:

a reset transistor configured to reset an anode of the light-emitting element to predetermined potential at predetermined timing, in which a gate terminal of the MOS capacitance is connected to a source of the reset transistor and the anode of the light-emitting element.

(3)

The pixel circuit described in the (2), in which the MOS capacitance has the source potential and the drain potential that are identical to cathode potential of the light-emitting element.

(4)

The pixel circuit described in any of the (1) to (3), further including:

a driving transistor having a source connected to an anode of the light-emitting element; and a sampling transistor having a source connected to a gate of the driving transistor, the sampling transistor being configured to sample signal voltage to be written into the driving transistor.

(5)

The pixel circuit described in the (4), in which the driving transistor is a P-channel MOS transistor.

(6)

A pixel circuit comprising:

a light-emitting element configured to emit light at luminance corresponding to an amount of current; and a capacitance disposed in parallel to the light-emitting element, said capacitance having a variable capacitance value.

(7)

The pixel circuit according to (6), wherein the capacitance has a capacitance value that is smaller when the light-emitting element emits light compared to when the light-emitting element does not emit light.

(8)

The pixel circuit according to (6) or (7), wherein the capacitance is a metal oxide semiconductor (MOS) capacitance.

(9)

The pixel circuit according to (8), wherein the MOS capacitance comprises a MOS transistor.

(10)

The pixel circuit according to (9), wherein the MOS transistor comprises a gate, source and drain, wherein the source and drain are formed as a common doped area.

(11)

The pixel circuit according to (9), wherein the MOS transistor comprises a gate, source and drain, wherein the source and drain are formed as separated doped areas.

(12)

The pixel circuit according to (11), further comprising one or more vias and/or connection lines connecting source and drain.

(13)

A display device including:

a pixel array unit in which the pixel circuit described in any of the (1) to (12) is disposed; and a driving circuit configured to drive the pixel array unit.

(14)

An electronic apparatus including:

the display device described in the (13).

REFERENCE SINGS LIST

C MIM capacitance
C1 Capacitor
C2 Capacitor
Ca Capacitor
Ccs Capacitor
Cs Capacitor
Csub Capacitor
EL Organic EL element
T1 Driving transistor
T2 Driving transistor
T11 Transistor
T12 Transistor
T13 Transistor
T14 Transistor
T21 Transistor
T22 Transistor
T23 Transistor
124 Transistor
T25 Transistor
T26 Transistor
T3 MOS capacitance
T4 MOS capacitance
T5 MOS capacitance

The invention claimed is:

1. A display apparatus comprising:

a light-emitting element;

a first capacitor;

a second capacitor, which is a metal oxide semiconductor (MOS) capacitor;

a first transistor configured to supply a data voltage from a data line to the first capacitor;

a second transistor configured to supply driving current according to a voltage stored in the first capacitor from a first voltage line to the light-emitting element; and a third transistor electrically connected to an anode electrode of the light-emitting element, wherein a channel length of the third transistor extends along a first direction, and a first contact of the second capacitor and a second contact of the second capacitor are arranged along a second direction that is different from the first direction.

2. The display apparatus according to claim 1, wherein the first capacitor is a metal insulator metal (MIM) capacitor.

3. The display apparatus according to claim 1, further comprising:

a capacitance including a first electrode formed by at least a portion of a line.

4. The display apparatus according to claim 3, wherein the capacitance is electrically connected to the second transistor and the line is the first voltage line.

5. The display apparatus according to claim 1, wherein the first capacitor and the second capacitor are directly electrically connected to the second transistor.

6. The display apparatus according to claim 1, wherein a first electrode of the second capacitor is formed in a semiconductor layer.

7. The display apparatus according to claim 1, wherein the first transistor is a p-channel transistor.

8. The display apparatus according to claim 1, wherein a gate of the first transistor is electrically connected to a first control line.

9. The display apparatus according to claim 1, wherein the third transistor is electrically connected between an anode electrode and a second voltage line.

10. The display apparatus according to claim 9, wherein the second voltage line is electrically connected to a cathode electrode of the light-emitting element.

11. The display apparatus according to claim 1, wherein a gate of the third transistor is electrically connected to a second control line.

12. The display apparatus according to claim 1, further comprising:

a fourth transistor electrically connected in series with the second transistor.

13. The display apparatus according to claim 12, wherein a gate of the fourth transistor is electrically connected to a third control line.

14. The display apparatus according to claim 12, wherein a channel length of the fourth transistor extends along the first direction.

15. The display apparatus according to claim 1, wherein an active area of the first transistor and an active area of the second transistor are separated.

16. The display apparatus according to claim 1, wherein a channel length of the first transistor and a channel length of the second transistor respectively extend along the first direction.

17. The display apparatus according to claim 1, wherein a channel length of the third transistor extends along the first direction.

18. The display apparatus according to claim 1, wherein an electrode of the second capacitor is electrically connected to the second transistor.

19. The display apparatus according to claim 18, wherein the electrode of the second capacitor is directly electrically connected to the second transistor.

20. The display apparatus according to claim 1, wherein the first contact of the second capacitor is arranged opposite to the second contact of the second capacitor.

* * * * *